United States Patent [19]

Garcia

[11] Patent Number: 5,994,801
[45] Date of Patent: Nov. 30, 1999

[54] MICROELECTROMECHANICAL GYROSCOPE

[75] Inventor: Ernest J. Garcia, Albuquerque, N.Mex.

[73] Assignee: Sandia Corporation, Albuquerque, N.Mex.

[21] Appl. No.: 09/133,043

[22] Filed: Aug. 12, 1998

[51] Int. Cl.⁶ .............................. H02K 7/00; G01C 19/02; G01C 19/08
[52] U.S. Cl. ...................... 310/40 MM; 74/5 R; 74/5.7; 74/5.8; 310/20; 310/80
[58] Field of Search ................................ 310/40 MM, 80; 74/5 R, 5.7, 5.8; 73/504.02, 504.08, 504.09, 504.11, 504.18; 300/20

[56] References Cited

U.S. PATENT DOCUMENTS

| | | | |
|---|---|---|---|
| 4,943,750 | 7/1990 | Howe | 310/309 |
| 5,015,906 | 5/1991 | Cho | 310/309 |
| 5,187,399 | 2/1993 | Carr | 310/40 MM |
| 5,378,583 | 1/1995 | Guckel | 430/325 |
| 5,535,902 | 7/1996 | Greiff | 216/2 |
| 5,631,514 | 5/1997 | Garcia | 310/309 |
| 5,725,729 | 3/1998 | Greiff | 156/657.1 |

OTHER PUBLICATIONS

E.J. Garcia and J.J. Sniegowski, "Surface Micromachined Microengine, " *Sensors and Actuators A*, vol. 48, pp. 203–214 (1995).

J.–B. Huang, Q.–Y. Tong and P.–S. Mao, "Gas–Lubricated Microbearings for Microactuators, " *Sensors and Actuators A*, vol. 35, pp. 69–75 (1992).

H. Guckel, K.J. Skrobis, J. Klein, and T.R. Christensen, "Micromechanics Via X–Ray Assisted Processing, " *Journal of Vacuum Science and Technology A*, vol.12, pp. 2559–2564, Jul./Aug. 1994.

W. Ehrfeld, F. Gotz, D. Munchmeyer, W. Scheib and D. Schmidt, "LIGA Process: Sensor Construction Techniques Via X–Ray Lithography, " THO 215–4/88/0000–0001, IEEE, 1988.

E.W. Becker, W. Ehrfeld, P. Hagmann, A. Maner and D. Munchmeyer, "Fabrication of Microstructures with High Aspect Ratios and Great Structural Heights by Synchrotron Radiation Lithography, Galvanoforming, and Plastic Moulding (LIGA Process), " *Microelectronic Engineering*, vol. 4, pp. 35–56 (1986).

W.C. Tang, T.–C.H. Nguyen and R.T. Howe, "Laterally Driven Polysilicon Resonant Microstructures," *Sensors and Actuators*, vol. 20, pp. 25–32 (1989).

J.J. Sniegowski and E.J. Garcia, "Microfabricated Actuators and Their Application to Optics, " Presented at the SPIE International Symposium on Optoelectronic, Microphotonic, & Laser Technologies, San Jose, CA, Feb. 1995 (*Proc. SPIE*, vol. 2383, pp. 46–64, 1995).

"Gyroscope," *The New Encyclopaedia Britannica*, vol. 5, pp. 594–596 (1988).

W.W. Stout, *A War Job "Thought Impossible"*, pp. 9–11, (Chrysler Corporation, Detroit, 1945).

"Gyroscope, " *McGraw–Hill Encyclopedia of Science & Technology*, 8th Edition, vol. 8, pp. 303–308 (1997).

A. Lawrence, *Modern Inertial Technology: Navigation, Guidance, and Control*, pp. 1–23 (Springer–Verlag, New York, 1993).

"Gyroscope,"*The Concise Columbia Encyclopedia*,(Columbia University Press, 1991).

*Primary Examiner*—Nestor Ramirez
*Assistant Examiner*—Burton Mullins

[57] ABSTRACT

A gyroscope powered by an engine, all fabricated on a common substrate in the form of an integrated circuit. Preferably, both the gyroscope and the engine are fabricated in the micrometer domain, although in some embodiments of the present invention, the gyroscope can be fabricated in the millimeter domain. The engine disclosed herein provides torque to the gyroscope rotor for continuous rotation at varying speeds and direction. The present invention is preferably fabricated of polysilicon or other suitable materials on a single wafer using surface micromachining batch fabrication techniques or millimachining techniques that are well known in the art. Fabrication of the present invention is preferably accomplished without the need for assembly of multiple wafers which require alignment and bonding, and without piece-part assembly.

19 Claims, 15 Drawing Sheets

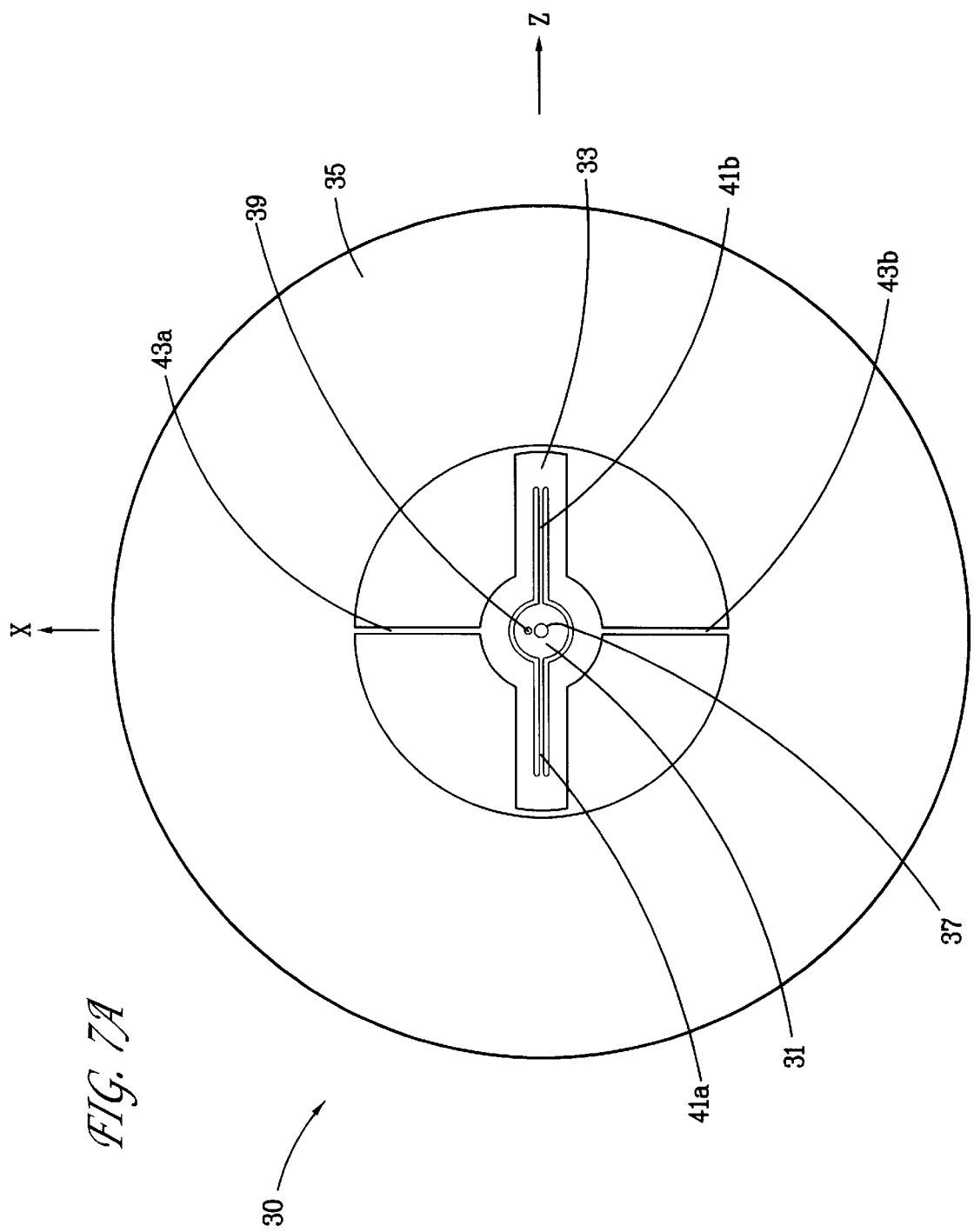

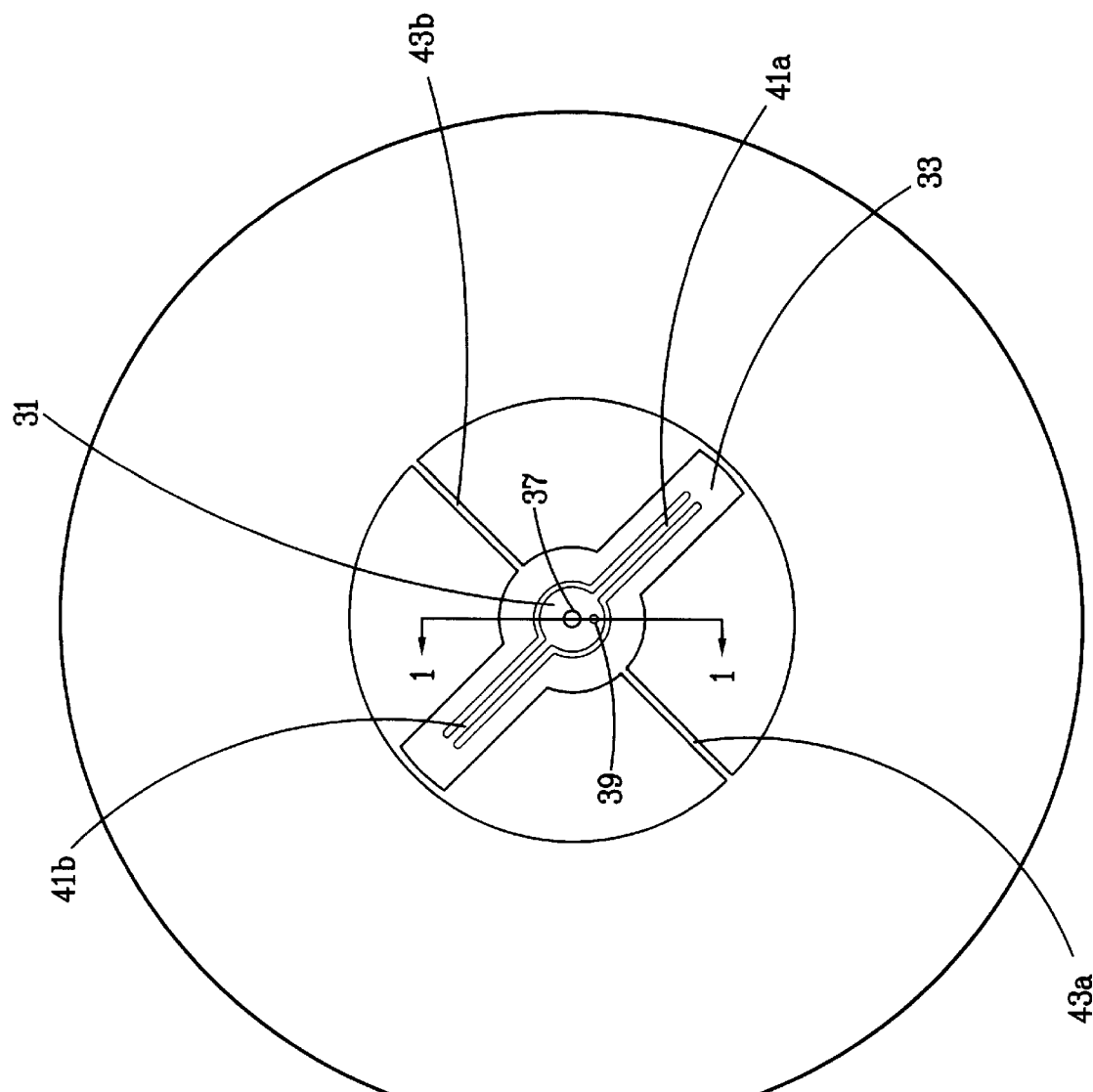

SECTION 1-1

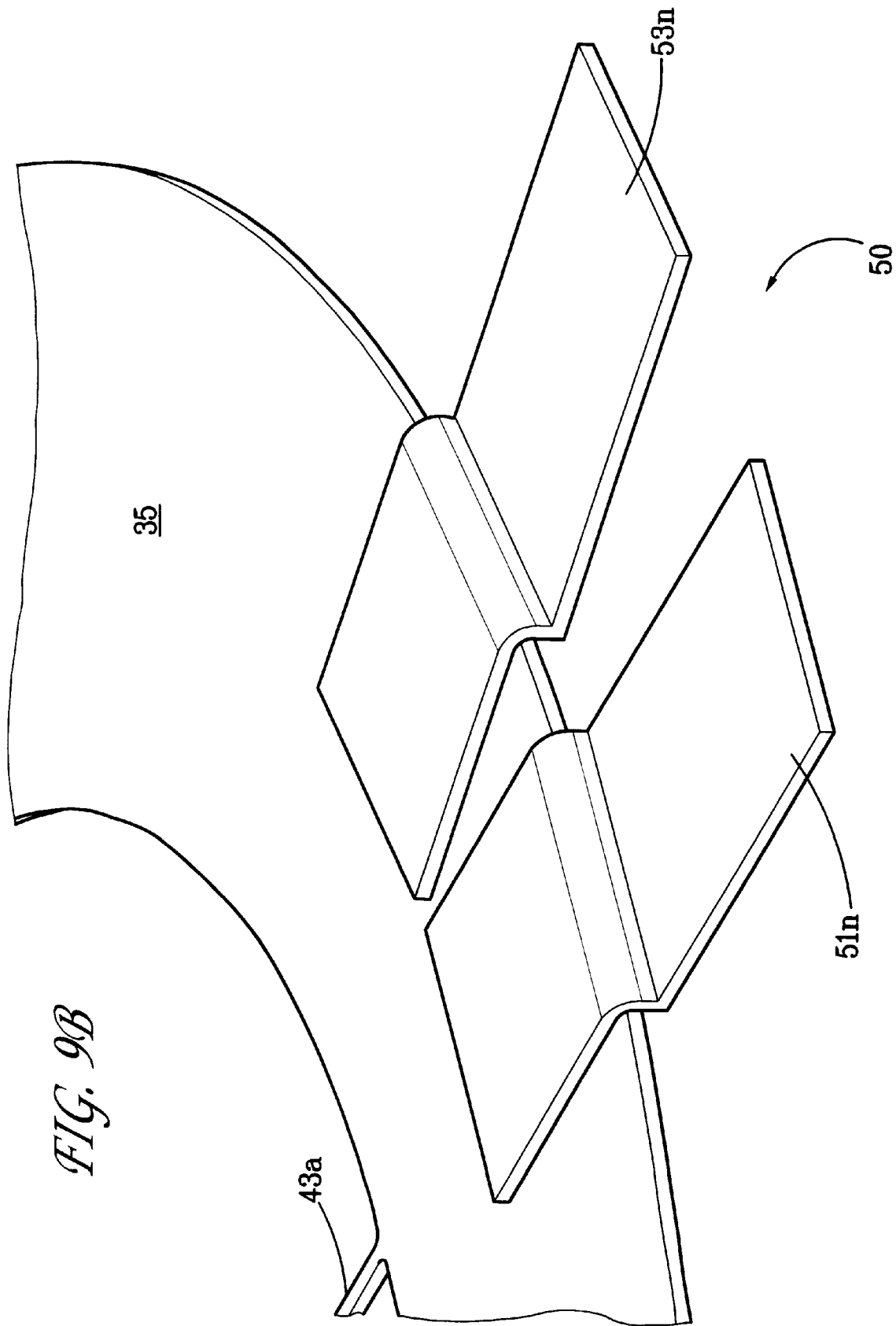

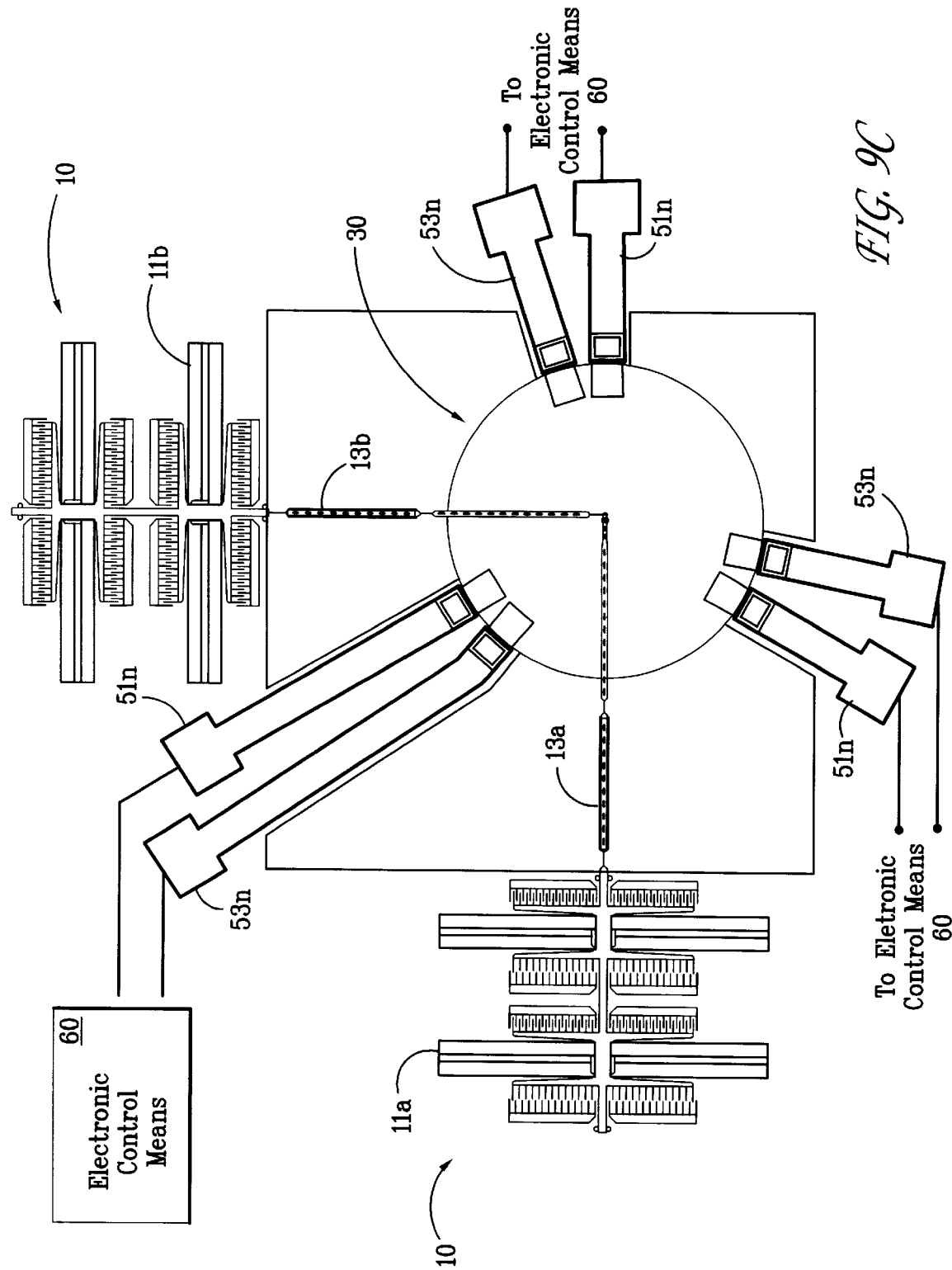

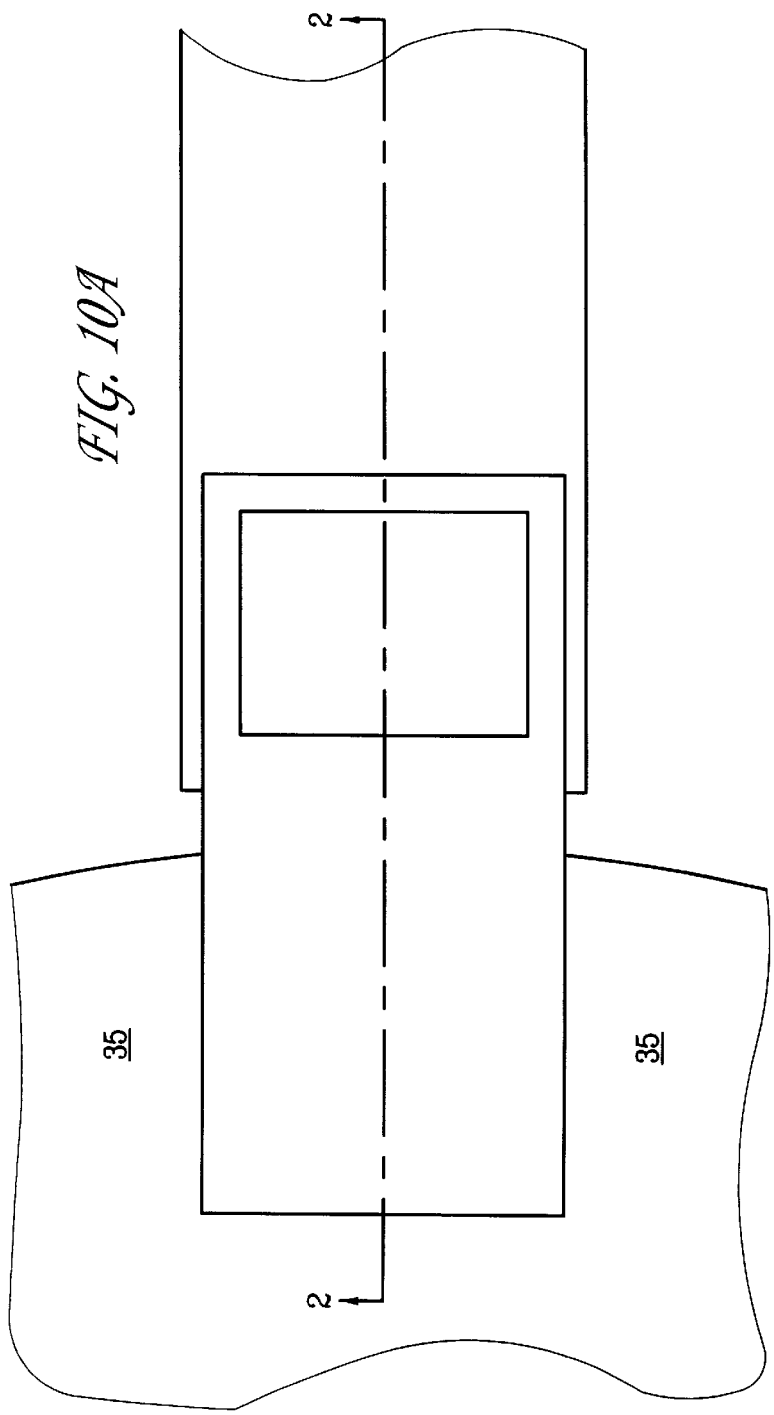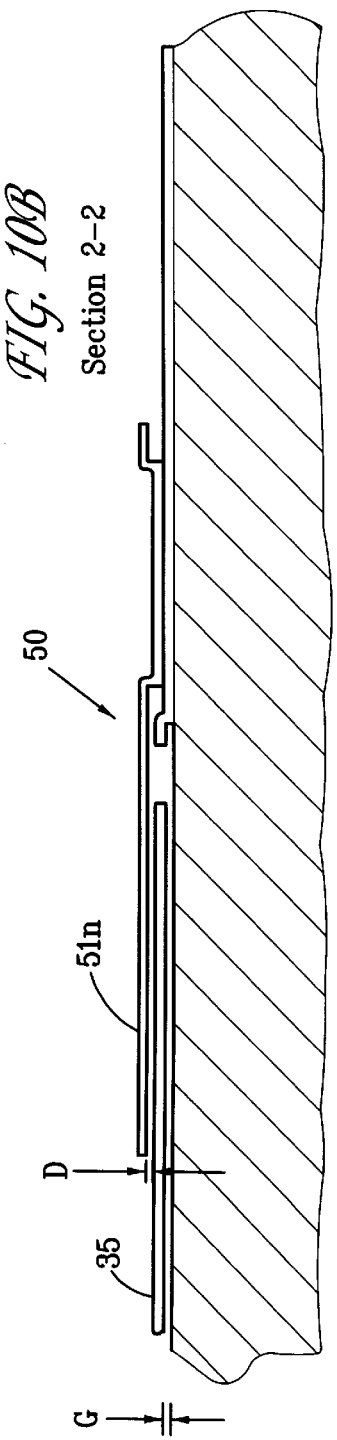

MICROELECTROMECHANICAL GYROSCOPE

This invention was made with United States Government support under Contract No. DE-AC04-94AL85000 awarded by the U.S. Department of Energy. The Government has certain rights in this invention.

FIELD OF THE INVENTION

The present invention relates to a gyroscope fabricated, operated and controlled in the microdomain. The present invention combines a microengine capable of providing rotational power to a gyroscope in order to cause rotation of the gyroscope's rotor wheel, thus providing a compact, light weight and small navigational device.

BACKGROUND OF THE INVENTION

Since World War II, human innovation has resulted in great strides in automatic navigation of vehicles and other objects. In particular, automatic navigation makes airline flights safer and less expensive, car travel and transportation more versatile and ocean travel more exacting. Furthermore, automatic navigation is heavily employed in missile systems and munitions. Navigation can be automated with both earth-bound devices or orbiting satellites. In its most versatile form, however, automatic navigation is completely self contained and commonly referred to as "inertial navigation."

Early inertial navigation systems used complex mechanical gimbal structures and mechanical devices with spinning wheels. These devices, known as gyroscopes, are capable of defining a fixed direction in space and can determine the change in angle (e.g., the angular rate) of its carrying vehicle with respect to a specified reference frame. For example, if the base of a three-ringed gyroscope is held in the hand with the rotor spinning and turned about in any of the three axes, the rotor axle will continue to point in the original direction in space. This property is known as gyroscopic inertia. If the speed of the rotor decreases, the gyroscopic inertia will gradually disappear, the rotor's axle begins to wobble and will ultimately take up any convenient position.

As early as the 19th century, J. B. L. Foucault mounted a spinning wheel within gimbal rings (a set of rings that permitted the wheel to turn in any direction) and demonstrated that the spinning wheel maintained its original orientation in space regardless of the Earth's rotation. The gimbals allowed the gyroscope to stabilize a mass to which it was attached (e.g., the platform) so that it remained in a fixed attitude relative to a chosen coordinate plane, even as the object moved around any of the three major coordinate axis. Recent inertial navigation systems rely on software and lasers to obtain information from the gyroscope to determine the angular movement of the vehicle to which the gyroscope is attached. Recent technology has also taken one further step by employing orbiting satellites (such as the Global Positioning Satellite system) and newer inertial navigation systems to obtain a higher-precision, higher-accuracy locating device.

Typical gyroscopes include an internal mass or wheel called a rotor wheel capable of spinning rapidly. In suspension, the rotor is typically free to turn in any coordinate axis. When the rotor is spinning, the gyroscope will resist changes in the orientation of its spin axis. This phenomena is explained by the moment of momentum principle which states that a steady spinning mass (possessing angular momentum) resists being disturbed and will produce a reacting torque in response to any disturbance, the disturbance being defined as that which causes the angular momentum vector to experience an angular rate. The reacting torque is then equal to the negative of the vector cross-product of the rate of change of angular position vector (disturbance) and the angular momentum vector of the spinning mass. Thus, as a vehicle (such as a ship or missile) pitches and rolls in various directions, the gyroscope holds the same plane of rotation which is not influenced by the changing directions of the vehicle.

Gyroscopes can be employed mounted to a stabilized platform or base (whose orientation in a moving vehicle remains fixed in space by employing one or more gimbals attached to the gyroscope) to thereby maintain the rotor's orientation regardless of any movement of the base. Gyroscopes can also be mounted directly to a vehicle (known as "strapdown"). Further, gyroscopes can be operated as a "closed loop" or "open loop" system. A closed loop gyroscope system means that a feedback information loop from the gyroscope output introduces a restoring force to the gyroscope, by torquing or platform motions, to maintain the gyroscope at its null (or initial) orientation. An open loop system means that the gyroscope is allowed to operate off its null orientation as it responds to input angular rates.

Gyroscopes are heavily used in guidance, navigation and stabilization applications. For example, gyroscopes can be used to measure the angular deviation of a guided missile from its desired flight trajectory; to determine the heading of a vehicle for steering; to determine the heading of an automobile as it turns; to indicate the heading and orientation of aircraft during and after a series of maneuvers; or to stabilize and point radar dishes and satellites. Gyroscopes respond to vehicle angular rates (e.g., rates of angular change between vehicle axes and reference axes) which allow the computation of the angles between vehicle axes and reference axes. Gyroscopes have also been used in personal computer products such as a computer mouse, for increased control and sensitivity. Furthermore, a gyroscope can counteract the rolling effect on a vehicle, and thus, is a preferred stabilization tool for vehicles such as a ship or missile.

A significant disadvantage of prior art gyroscopes is their size. While early gyroscopes were large units (e.g., more than two feet across) and heavy, gyroscope technology has lead to the development of smaller units, but still in the macroscopic domain. However, as described in the article titled "Surface Micromachined Microengine", E. J. Garcia, J. J. Sniegowski, Sensors and Actuators, A 48, pp. 203–214 (1995), recent advances in surface micromachining have led to the development of electrostatic actuators capable of driving microscopic machinery. Micrometer devices are capable of producing sufficient force and/or torque to drive small objects such as a gyroscope rotor. The present invention discloses and claims a gyroscope which has all of the advantages and uses of a macroscopic gyroscope, but manufactured and used within the microdomain (e.g., mechanical devices which are fabricated on the scale of micrometers, or approximately $1 \times 10^{-6}$ meters).

In particular, electrically powered micrometer-sized micro-motors (or "microengines" as they are known) are fabricated to provide rotational motion to an object. The fabrication of these devices involves the etching of a silicon substrate and depositions of thin films of semiconductor materials. The resulting device includes moveable structures such as links and gears. All elements on these devices are fabricated in the microdomain. Such devices are disclosed and claimed in U.S. Pat. No. 5,631,514, titled "Microfabricated Microengine for Use as a Mechanical Drive and Power Source in the Microdomain and Fabrication Process," the disclosure of which is incorporated by reference.

The micrometer-sized invention disclosed herein differs from existing gyroscope devices in several respects. First, until the present invention, gyroscopes with a free-spinning rotor did not exist which were fabricated by micromachinery techniques to achieve functionality in the micrometer domain. Free-spinning rotor gyroscopes can provide up to a thousand times greater sensitivity than a comparably sized vibratory rotor. Second, gyroscopes in the micrometer domain are capable of being mass produced since the process utilizes the same processing which is used to fabricate millions of integrated circuit chips. Further, microdomain fabricated gyroscopes are capable of being electronically integrated with other electronics similarly fabricated on the chip. Another advantage to the present invention is the fabrication of multiple gyroscopes on the same fabrication plane so that each gyroscope is a functional backup device in the event of a major failure of one or more adjacent gyroscopes. Additionally, microdomain fabricated gyroscopes can now be used in applications where cost and size of the device was previously prohibitive.

It is therefore an object of the present invention to provide a gyroscope manufactured and used in the micrometer domain.

It is a further object of the present invention to provide a gyroscope which is driven by a microengine.

It is also an object of the present invention to provide a navigational device sized in the micrometer domain.

It is a further object of the present invention to utilize a microengine to operate and control a microdomain fabricated gyroscope requiring sufficient force or torque to achieve a predefined angular rotation.

It is also an object of the present invention to provide a microdomain gyroscope mechanically and electronically fabricated to achieve high signal-to-noise ratios in position detectors, enhanced-force logic for closed loop sensor devices and digitization of the resulting output data.

SUMMARY OF THE INVENTION

The present invention is a multiple degree of freedom system. In particular, the present invention includes an engine which controls and operates a gyroscope, all fabricated on the same integrated circuit. The microengine disclosed herein provides torque to a microdomain gyroscope rotor for continuous rotation at varying speeds and direction.

The present invention is preferably fabricated of polysilicon or other suitable materials on a single wafer using surface micromachining batch fabrication techniques well known in the art. Fabrication of the present invention is accomplished without the need for assembly of multiple wafers which require bonding, alignment or the addition of other separately fabricated parts.

The novel features of the present invention will become apparent to those of ordinary skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the spirit and scope of the invention will become apparent to those of ordinary skill in the art from the detailed description of the invention and claims that follow.

BRIEF DESCRIPTION OF THE DRAWINGS

FIG. 7a is a detailed partial top view of the rotor mechanism of the present invention;

FIG. 8a is another detailed partial top view of the rotor mechanism of the present invention;

FIG. 9b is an enlarged partial perspective view of one pair of the sense and force elements shown in FIG. 9a.

FIG. 9c is plan view showing a particular arrangement of the sense and force elements in relation to other elements of the present invention;

FIG. 10a is a top plan illustration of a single sense element of the present invention; and FIG. 10b is a partial cross sectional view of FIG. 10a as seen along section line 2—2.

DETAILED DESCRIPTION OF THE INVENTION

Figure 1:
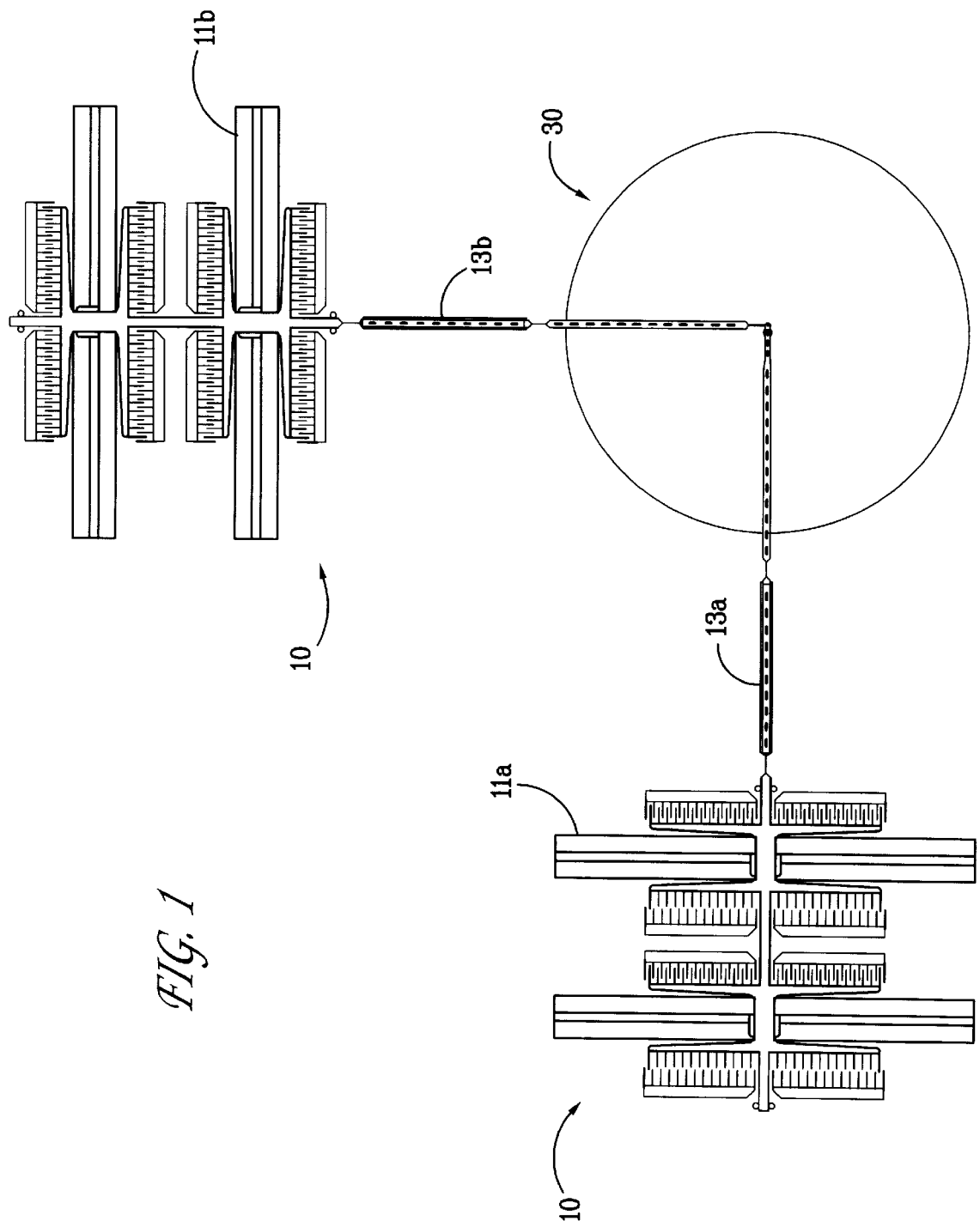
FIG. 1 schematically illustrates a top plan view of the present invention.

As seen in FIG. 1, the present invention is a non-vibratory free rotor gyroscope which includes microengine 10 and rotor/suspension assembly 30 formed upon a substrate base (not shown). Microengine 10 includes two primary components: linear actuators 11a, 11b; and drive linkages 13a, 13b. As shown in FIGS. 5–7 and 8b, rotor/suspension assembly 30 includes four major components: circular anchor element 31; intermediate suspension element 33; rotor wheel 35; and platform P all coupled together and fabricated upon the same silicon plane. Microengine 10 is adapted to engage and provide torque to rotor/suspension assembly 30 in the microdomain.

Figure 2:
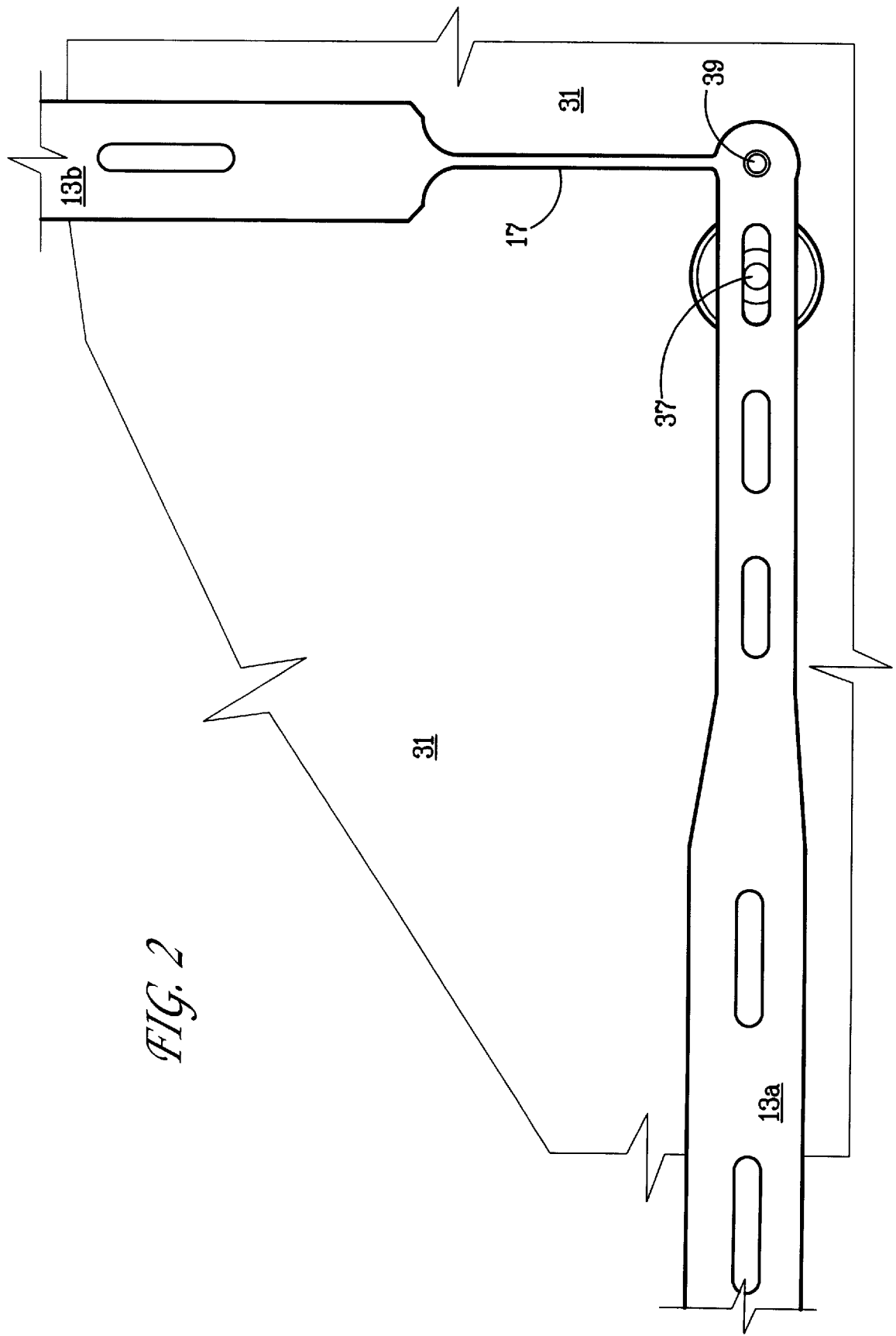
FIG. 2 illustrates a detailed partial top view of the drive linkage attached to the rotor/suspension assembly of the present invention.
Figure 3:
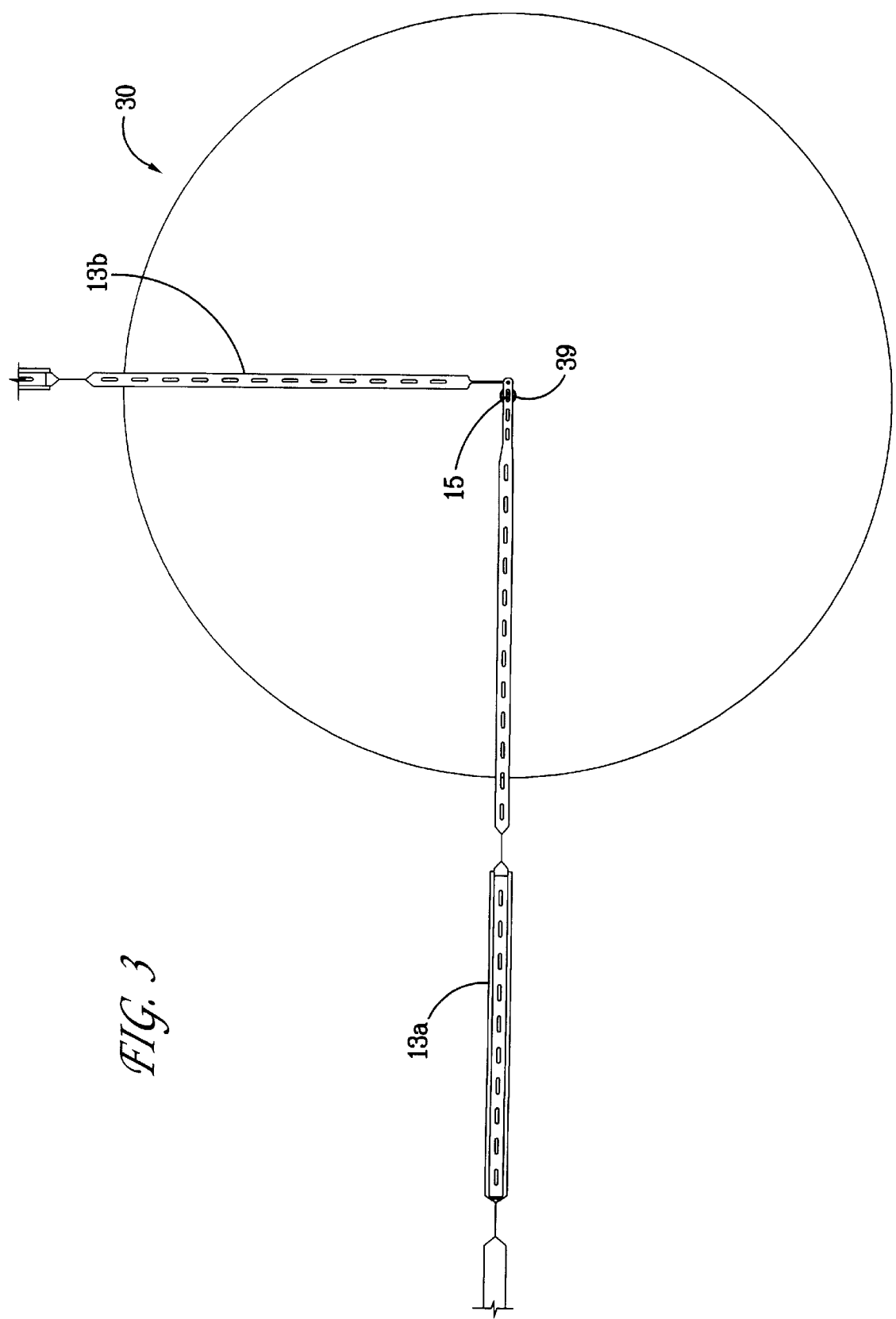
FIG. 3 illustrates another partial top plan view of FIG. 1.

As seen in FIGS. 1–3, microengine 10 employs linear actuators 11a, 11b as a drive source. Both actuators 11a, 11b are designed to convert linear oscillatory motion into rotational motion to drive a rotor/suspension assembly 30 through drive linkages 13a, 13b by phasing the operation of each actuator substantially 90 degrees apart. When the actuators are phased in this fashion, a positive torque is created about a central axis 37 of the circular anchor element 31. As those of skill in the art will realize, linear actuators that can be used as a drive source to drive the system include electrostatic actuators, electromagnetic actuators, pneumatic actuators, piezoelectric actuators, shape memory alloy actuators and phase change actuators. In the preferred embodiment, electrostatic bi-directional comb-drive actuators are employed as the power source, and can be designed to have large linear displacements of up to several tens of micrometers.

Figure 4:
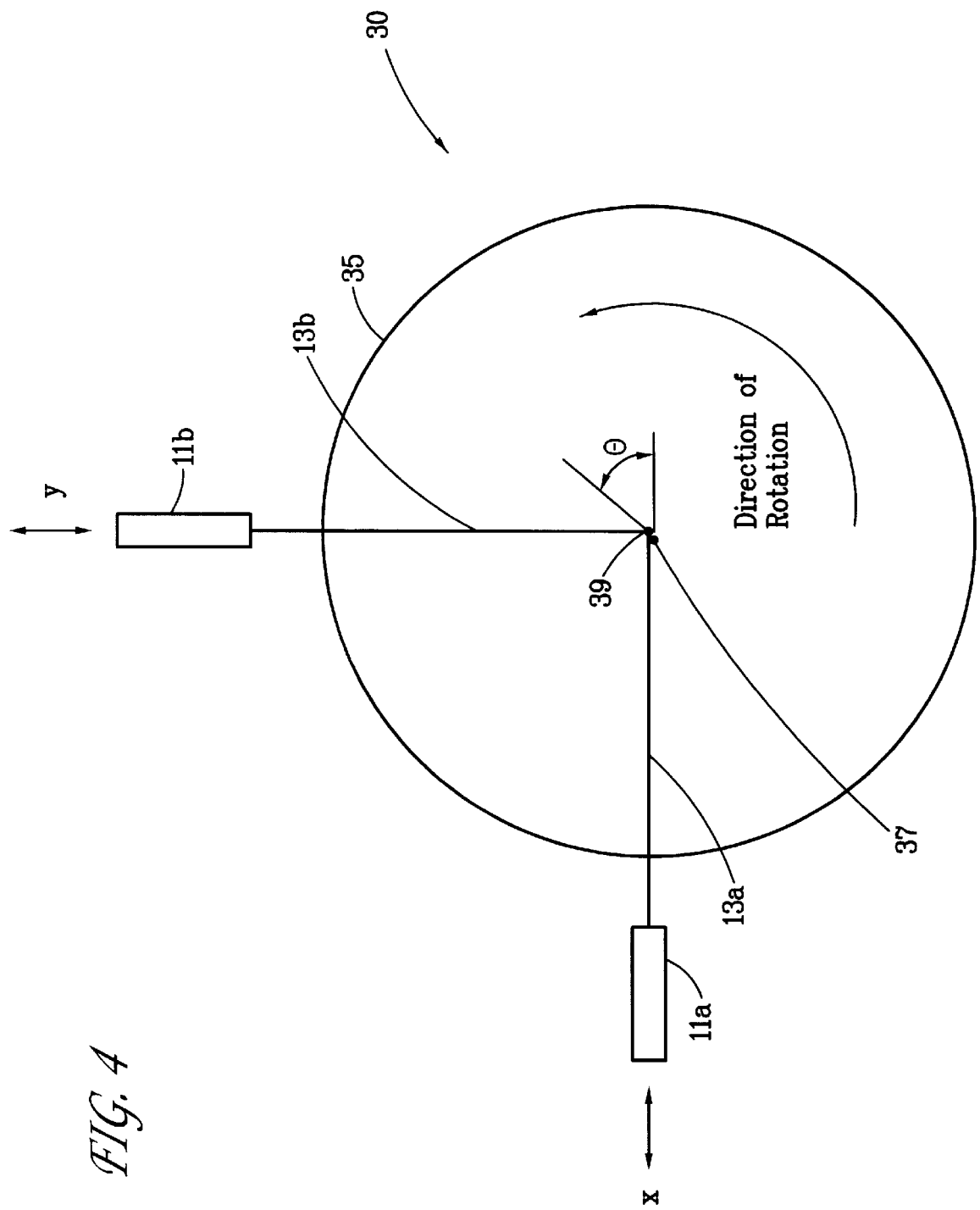
FIG. 4 illustrates another partial top plan view of FIG. 1.
Figure 5:
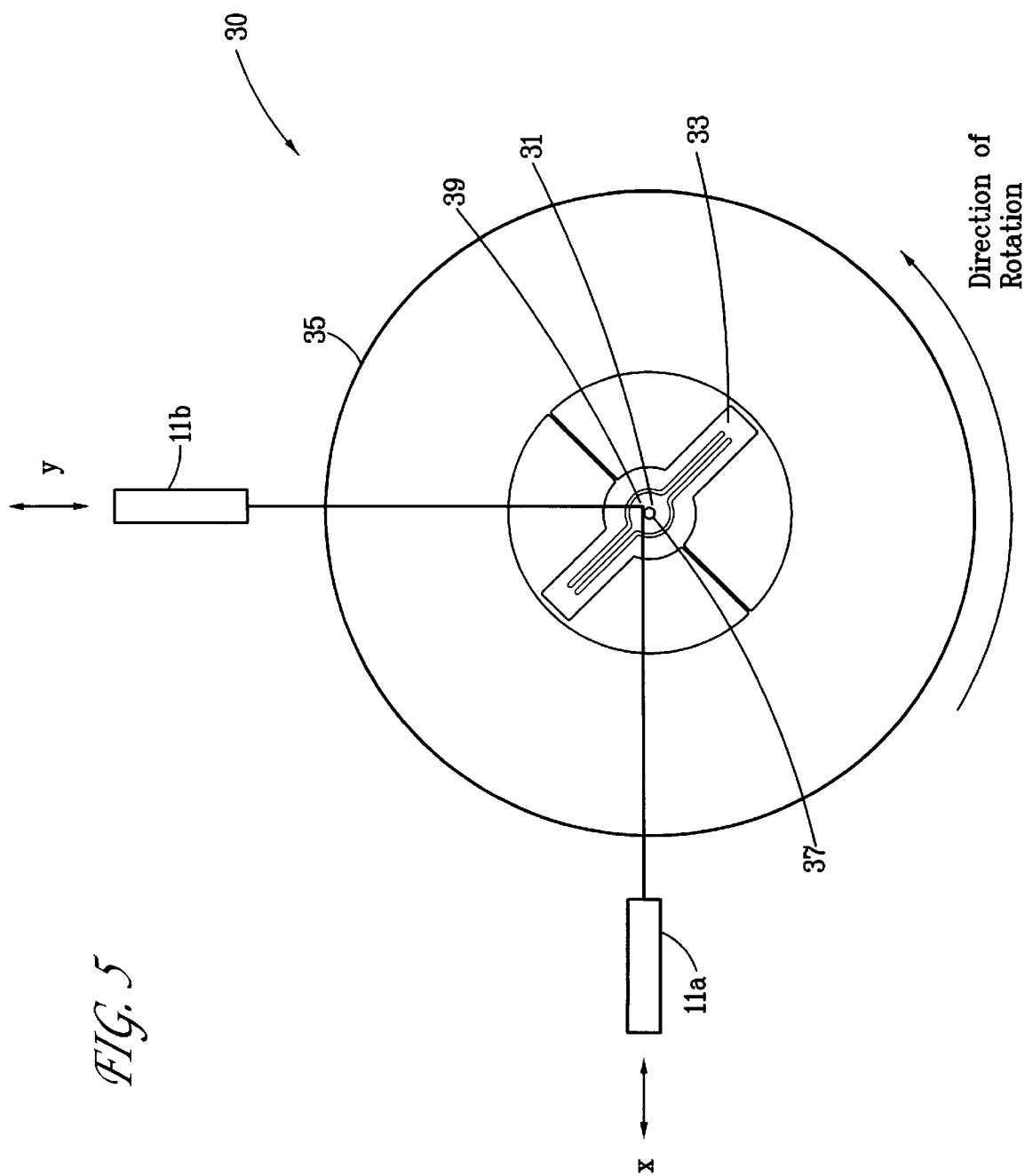
FIG. 5 illustrates another partial top plan view of FIG. 1.
Figure 6:
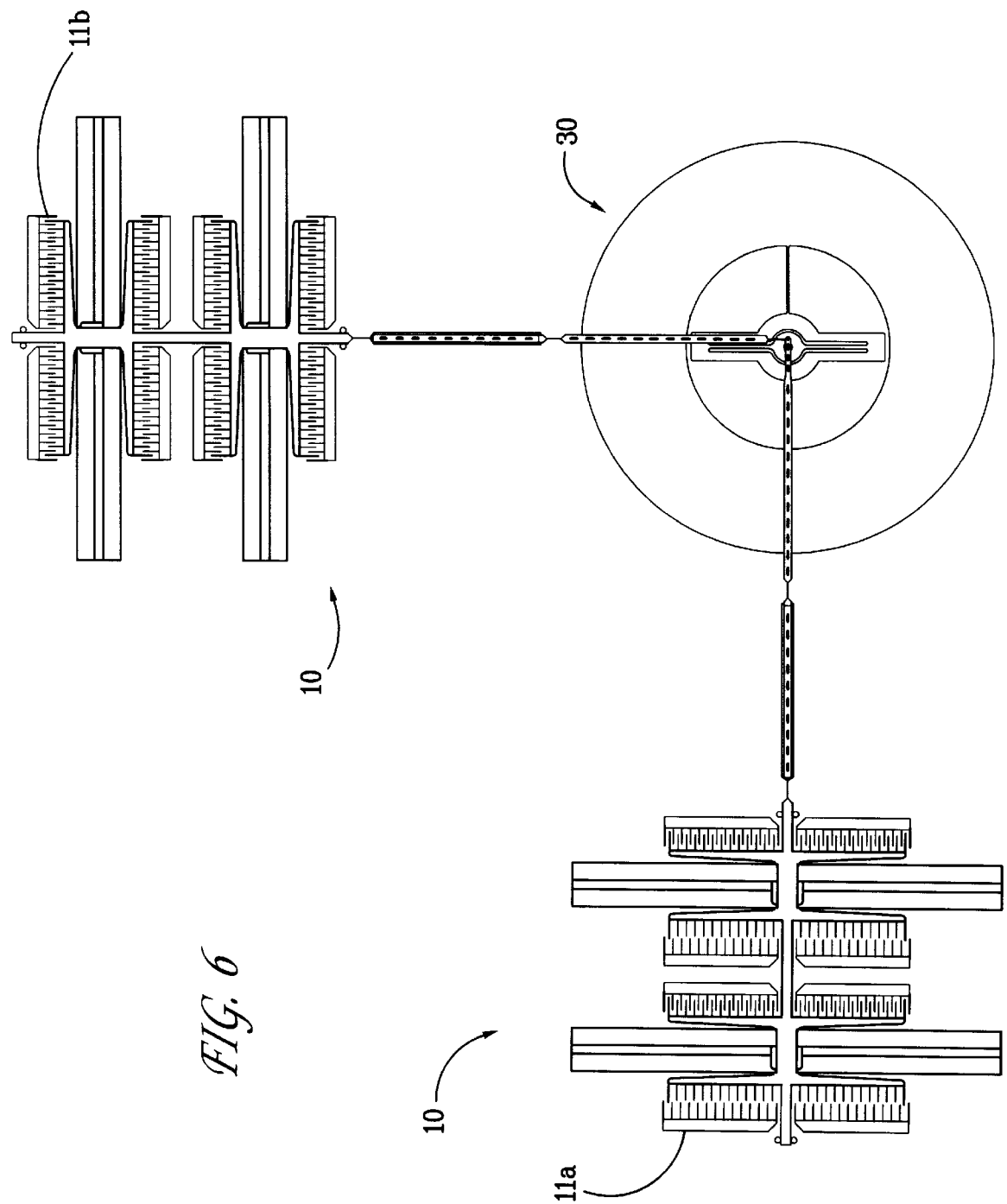
FIG. 6 illustrates another top plan view of the present invention, illustrating components of the rotor/suspension assembly attached to an engine.
Figure 8B:
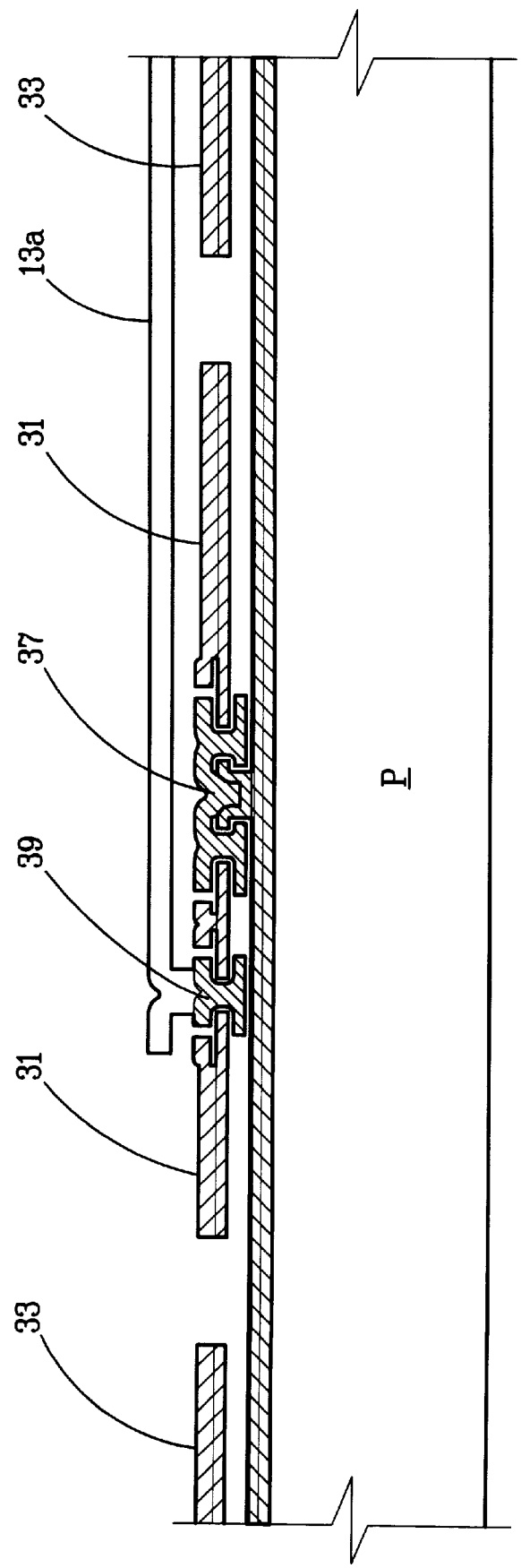
FIG. 8b is partial cross sectional view of FIG. 8a as seen along section line 1—1.

As seen in FIG. 2, microdomain actuator drive linkages 13a, 13b can be coupled to each other at their ends using a flexural joint 17. Drive linkage 13a, however, is rotationally coupled to circular anchor element 31 through link pivot 39. Therefore, rotor/suspension assembly 30 is connected to microengine 10 through links 13a, 13b via link pivot 39 as seen in FIGS. 2 and 8b Because of the synchronized motion of actuators 11a, 11b in the X and Y coordinate axes, rotor wheel 35 is capable of rotation when actuators 11a, 11b are operated in the following manner. As seen in FIGS. 4–5, linear actuator 11a is adapted to move along the coordinate X axis with the application of a driving voltage thereto. As actuator 11a initially moves to the left as illustrated, the circular object (representing the load to be driven, such as rotor/suspension assembly 30) is forced to rotate in a counter-clockwise direction. A linkage arm assembly connects the linear actuator 11a with the object 30 through pivoting joint 39. While the operation of actuator 11a will rotate the object 30 slightly, at angles θ of between 0 to 180 degrees, torque cannot be produced about the object's center to cause a complete rotation of object 30. To resolve this, an additional actuator 11b capable of linear movement in the coordinate Y axis is employed. As seen in FIGS. 1–2, actuator 11b is connected to the same linkage assembly 13b used in the single actuator configuration to provide torque producing capability at angles θ equal to 0 and 180 degrees. Actuator 11b must be operated substantially 90 degrees out of phase with the first actuator 11a to provide rotational movement of object 30. The resulting rotational direction (clockwise or counterclockwise) of object 30 is determined by leading or lagging actuator 11b by 90 degrees from actuator 11a.

In a preferred embodiment of the present invention, rotor wheel 35 is rotated from θ=0 to 90 degrees in a counter-clockwise direction by movement of first actuator 11a in the negative X coordinate direction (to the left in FIG. 4), while second actuator 11b is pulling in the positive Y coordinate direction (upwards in FIG. 4). Rotor wheel 35 can then be rotated from θ=90 degrees to 180 degrees in the counter-clockwise direction by the continued pulling of first actuator 11a in the negative X coordinate direction and the pushing of second actuator 11b in the negative Y direction (downwards in FIG. 4). Rotor wheel 35 can then be continuously rotated from θ=180 to 270 degrees by the pushing of first actuator 11a in the positive X coordinate direction (to the right in FIG. 4) and the pushing of second actuator 11b in the negative Y direction. Rotor wheel 35 can complete a full rotation (360 degrees) through the continued pushing of first actuator 11a in the positive X coordinate direction and the pulling of second actuator 11b in the positive Y direction. If actuators 11a, 11b continue this alternate push and pull process, rotor wheel 35 is allowed to freely and continuously rotate. As those of skill in the art will come to realize, the direction of rotation of the rotor is not important in implementing the present invention. Further, as those of skill in the art will come to realize, the rotational speed of rotor wheel 35 can be adjusted by changing the timing of a voltage drive signal applied to actuators 11a, 11b and by adjusting the amount of electrical power provided to actuators 11a, 11b.

Microengine 10 can be operated at varying speeds and its operation reversed, if desired. Linear actuators 11a, 11b are synchronized by either on-chip or external electronic control means 60 for providing linear oscillatory motion to links 13a, 13b in the X and Y coordinate directions to operate and control rotor/suspension assembly 30. Further, the electronic control means 60 can be used for measuring the average rotational speed of rotor wheel 35 and for controlling motion of the rotor wheel 35 to maintain a continuous angular speed. Because of the small size of microengines, high rotational speeds can be achieved and provide a unique approach to the operation and control of gyroscopic technology. In tests, the rotational speed achieved with an electrostatic comb-drive microengine driving an output gear is more than 300,000 revolutions per minute.

Figure 7B:
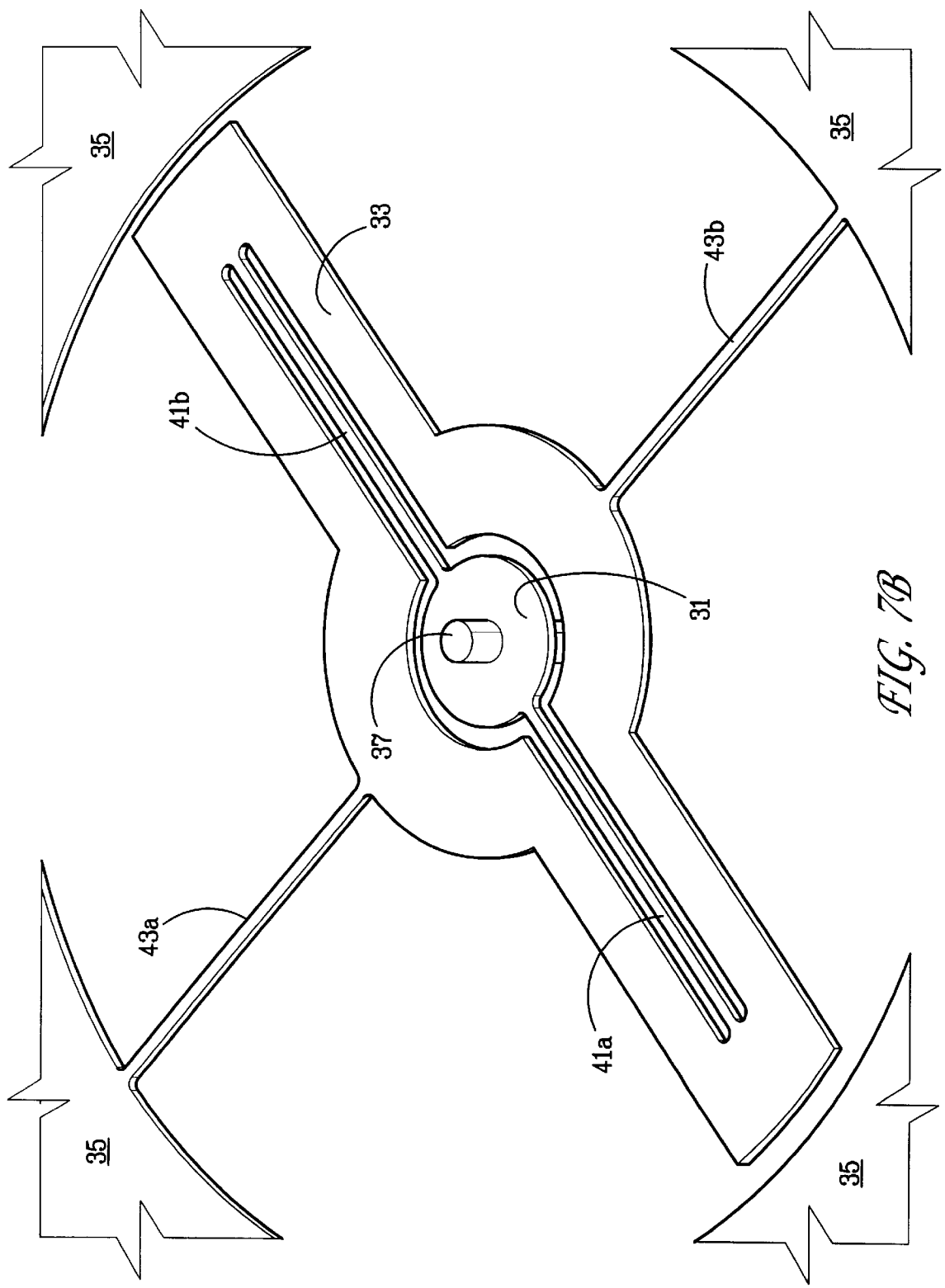
FIG. 7b is an exploded detailed partial top perspective view of the rotor/suspension assembly of the present invention.
Figure 7C:
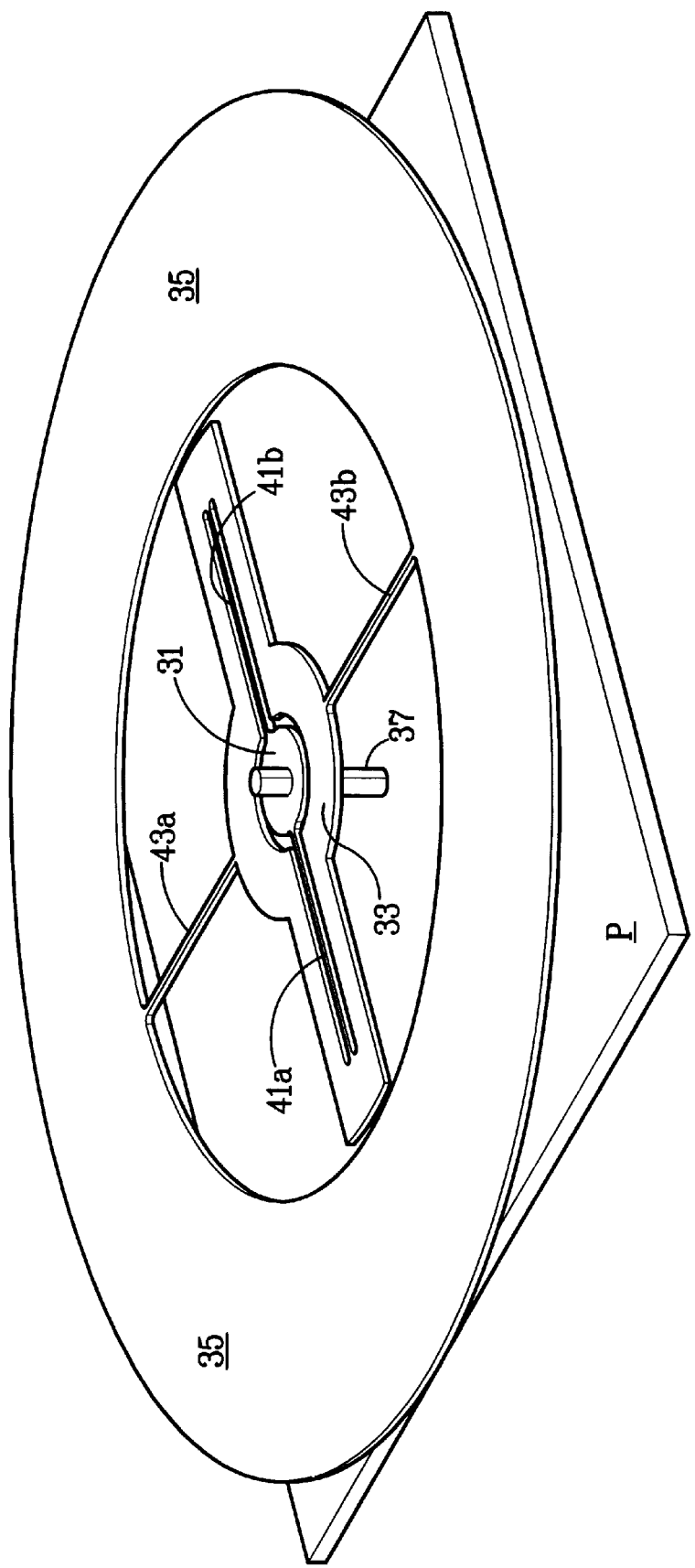
FIG. 7c is a partial top view of the rotor/suspension assembly of the present invention upon a substrate.

As illustrated in FIGS. 7a–7c, rotor/suspension assembly 30 is a free-rotor gyroscopic system. While the coordinate axes depicted in FIG. 7a, for example, are offset 90 degrees compared with FIGS. 4 and 5, those of skill in the art will appreciate that through appropriate coordinate axes transformations, these figures are equivalent. Rotatable rotor wheel 35 is suspended upon platform P (e.g., the underlying base or substrate as seen in FIGS. 7c and 8b) through torsional flexures 43a, 43b, intermediate suspension element 33, torsional flexures 41a, 41b, all of which are fabricated substantially within the center of rotor wheel 35. As seen in FIG. 2 and in FIGS. 4–5 and 8b, circular anchor element 31 includes center pivot 37 fabricated substantially in the center of anchor element 31 and coplanar therewith. Link pivot 39 is fabricated adjacent to the center pivot 37 in an offset fashion to provide a radius with respect to the center pivot 37 so that a torque can be produced about pivot 37 when forces are applied at link pivot 39 by microengine 10. Center pivot 37, in turn, is fabricated upon platform P as seen in FIG. 8b. Circular anchor element 31 is fabricated to be attached to, but within, intermediate suspension element 33 through z-axis torsional flexures 41a, 41b. In turn, suspension element 33 is mechanically fabricated to be attached to, but within, circular rotor wheel 35 through x-axis torsional flexures 43a, 43b. As seen in FIGS. 7 and 8, x-axis torsional flexures 43a, 43b are preferably fabricated orthogonally from z-axis torsional flexures 41a, 41b.

With the present invention, a gap G will exist between rotor assembly 30 and the platform P (see FIG. 10b). Preferably, gap G is approximately two micrometers. In this embodiment, circular anchor element 31 is constrained to rotate about the shaft axis (e.g., the Y coordinate axis) as a rigid body with respect to platform P. However, rotor wheel 35 is, according to the present invention, also adapted to rotate slightly about the coordinate X and Z axes as shown in FIG. 7a. In particular, due to the addition of the X-axis torsional flexures 43a, 43b, rotor wheel 35 is capable of rotating about the coordinate X axis as a body with respect to intermediate suspension element 33 and hence, the platform P. Similarly, due to the z-axis torsional flexures 41a, 41b, intermediate suspension element 33 is capable of rotation about the coordinate Z axis with respect to the circular anchor element 31. Therefore, rotor wheel 35 is capable of rotation about the coordinate X, Y and Z axes with respect to platform P.

As those of skill in the art will come to realize, the formation of the present invention is complementary to the components found on a conventional gyroscope: to wit, the suspension elements 41a, 41b, 43a, 43b are analogous to gimbals; the rotor wheel is analogous to the conventional gyroscope rotor wheel.

In operation of the gyroscope of the present invention, actuators 11a, 11b are first employed to drive rotor wheel 35 to a predetermined angular speed. In this manner, rotor wheel 35 will be enabled to deflect with respect to platform P as the orientation of platform P changes. When platform P experiences an angular rate $\omega^P$ about the z-axis with respect to a fixed inertial reference frame N, a torque is required to restore rotor wheel 35 to its original parallel orientation with respect to platform P. The torque required to restore rotor wheel 35 to the null or original orientation is directly proportional to the angular rate experienced by the platform P.

Because the rotor wheel 35 can rotate about the X and Z axes with respect to platform P, the angular orientation of the rotor wheel 35 with respect to platform P can be monitored to determine the angular rate of the platform P with respect to an inertial reference frame. In the preferred embodiment of the present invention, the gyroscope includes a capacitive means for sensing displacement and restoring orientation 50 of rotor wheel 35 as illustrated in FIGS. 9a–10b. This type of sensing means 50 is used to detect relative displacements of rotor wheel 35. Operation of the sensing means 50 as a closed-loop system is preferred over an open-loop system because it provides a smaller bias stability (i.e., measurement error) in addition to increased bandwidth, better linearity and provides more sensitive data information.

More particularly, FIG. 10b illustrates the preferred capacitive sense and restore design wherein the sensing means 50 is operated as a closed-loop system. Rotor wheel 35 and a sense element $51_n$ of the means for sensing and restoring orientation 50 form plates of a parallel-plate capacitor when a voltage potential exists across the distance defined by D. A change in the distance D between the plates will produce a corresponding change in capacitance which can be electrically monitored by an electronic control means 60 connected to the sensing means 50 for determining the change in the gap D between the two plates. By using conventional physics principles, this change in distance D over time can be used to determine the angular rate of platform P and to close a feedback loop that restores the rotor wheel 35 to an initial (i.e. unperturbed) position.

Preferably, the means for sensing and restoring orientation 50 is a plurality of paired cantilevered beams (or, sense elements $51_n$, $53_n$) which are placed around and in close proximity to rotor wheel 35. Preferably, each pair of sense elements $51_n$, $53_n$ are electrically conductive and are spaced, for example, 120 degrees apart, being positioned adjacent to and over or under rotor wheel 35. While not shown, each pair of sense elements $51_n$, $53_n$ are in electrical communication with the electronic control means 60 (which can be fabricated either on the chip or substrate, or located externally thereto) for communicating and processing sense and force information. Like the actuators disclosed in the present invention, the means for sensing and restoring orientation 50 is also electrostatic based.

Figure 9A:
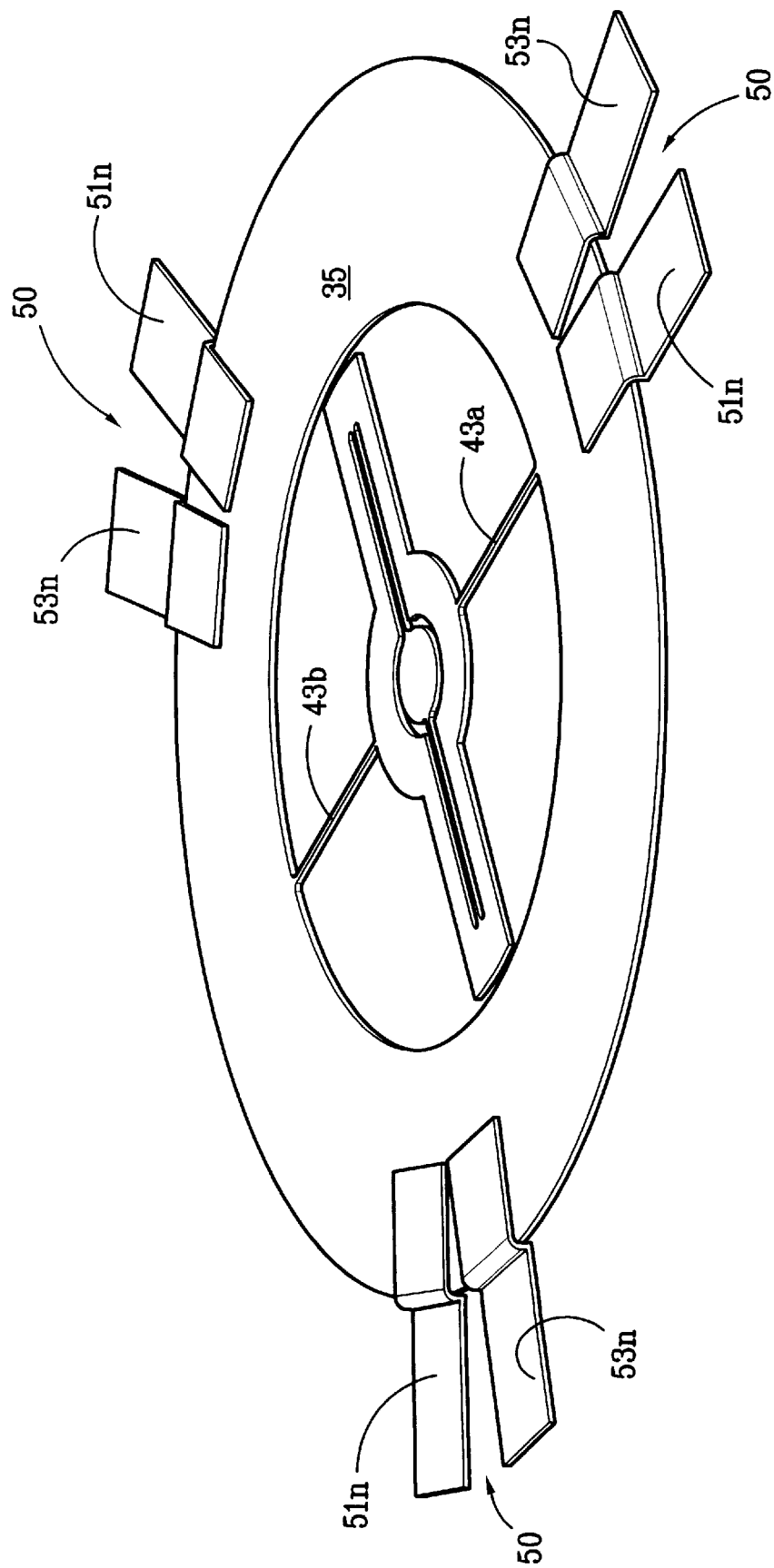
FIG. 9a is a partial side perspective view illustrating the sense and force elements of the present invention.

As stated previously, a closed-loop feedback control system is the preferred approach in utilizing the means for sensing and restoring orientation 50. As such, the electrostatic force existing between rotor wheel 35 and the sensing means 50 can be used as a part of a closed-loop feedback control system to restore rotor wheel 35 to its original orientation with respect to platform P after any movement of platform P. As seen in FIGS. 9a–9b, each pair of sense elements contains one sense element $51_n$ and one forcing element $53_n$. Sense element $51_n$ is employed for obtaining information relating to the determination of variations in gap D as previously described, while forcing element $53_n$ is employed to selectively apply an attractive force to rotor wheel 35 to restore gap D to an initial value.

As the angular orientation of the rotor wheel 35 with respect to platform P changes (i.e., as it rotates about the x and z coordinate axes), the three sense element pairs (one sense element from each sensor pair) equally spaced about the rotor wheel 35 are used to detect changes in the distance D through measured capacitance changes. The electrical information obtained from each of the sensor pairs can then be transmitted to the electronic control means 60 (see FIG. 9c), for determining the angular orientation of rotor wheel 35 with respect to platform P. This information can then be used by the electronic control means 60 for applying an appropriate voltage to one or more of the forcing elements $53_n$, as required, to electrically force the rotor wheel 35 (and the rotor assembly 30 in general) back to its original orientation with respect to platform P.

Because forcing elements $53_n$ can only apply an attractive force to rotor wheel 35, each attractive force generated by each forcing element $53_n$ must be selectively controlled and coordinated in magnitude and timing by the electronic control means 60 in order to obtain the necessary restoration torque to restore the rotor wheel to its original orientation. Applying conventional dynamics principles, those skilled in the art will know that the restoration torque will be proportional to the angular rate $\omega^P$ experienced by platform P with respect to a fixed inertial reference frame N. Thus, the angular rate experienced by platform P can be determined from the forces applied to rotor wheel 35 to keep it in the null or initial angular orientation with respect to platform P.

Those of skill in the art will come to realize that the means for sensing and restoring orientation 50 can also be designed as a single electrically conductive arm which is capable of both sensing capacitance differentials and providing voltage potentials in order to restore rotor wheel 35 to its original orientation. Further, to drastically reduce or eliminate component friction, the present invention may utilize gas bearings (such as those disclosed by J. B. Huang and P. S. Mao, "Gas Lubricated Microbearings for Microactuators", Sensors and Actuators A, vol. 35, pp. 69–75 (1992)) as required.

The present invention is preferably batch fabricated using polysilicon surface micromachining processes. This means that all components of the present invention have all joints and mechanical and electrical connections completed as part of the batch process. For this type of processing, all assembly is integral to the batch process so that no piece-part assembly is required to complete the gyroscope of the present invention. Preferably, the gyroscope of the present invention is made by a series of steps for depositing and patterning by etching alternating layers of chemical vapor deposited (CVD) polycrystalline silicon (also termed polysilicon) and silicate glass. By appropriately doping the polycrystalline silicon during deposition or processing, the resulting material can be made electrically conductive. After fabrication of the gyroscope structure, the silicate glass can be removed by a selective etching step (e.g. using hydrofluoric acid), thereby releasing the completed gyroscope for operation.

Other variations and modifications of the present invention will be apparent to those of ordinary skill in the art; and it is the intent of the appended claims that such variations and modifications be covered. For example, those of skill in the art will come to realize that the present invention can also be implemented in the millidomain using a millimotor as disclosed in U.S. patent application Ser. No. 08/874,815, which is incorporated herein by reference. Millidomain gyroscope structures may be beneficial in some applications because, for example, such structures offer increased sensitivities. It will also be apparent to those of ordinary skill in the art that the gyroscope of the present invention can be dynamically tuned by an appropriate selection of gyroscope masses and stiffnesses. The particular values and configurations discussed above can be varied, are cited to illustrate particular embodiments of the present invention and are not intended to limit the scope of the invention. Furthermore, it is contemplated that the use of the present invention can involve components having different characteristics as long as the principle, the presentation of an operable gyroscope manufactured and used in the microdomain or millidomain, is followed. The actual scope of the invention is intended to be defined in the following claims when viewed in their proper perspective based on the prior art.

What is claimed is:

1. A gyroscope comprising:
   a.) an engine formed upon a substrate and including a drive source adapted to provide a predetermined rotational torque; and
   b.) a rotatable rotor/suspension assembly formed upon the substrate, the assembly mechanically coupled to the engine to receive the torque.

2. The gyroscope of claim 1 wherein the engine is a microengine.

3. The gyroscope of claim 2 further comprising means for electronic control in electrical communication with the microengine and the rotor/suspension assembly, the electronic control means being adapted to control the operation of the microengine, to measure the rotational speed of the rotor/suspension assembly, to determine a distance differential due to the angular rotation of the substrate, to determine the angular orientation of the rotor/suspension assembly with respect to the substrate and to selectively apply a preselected electrostatic force to the rotor/suspension assembly to restore the rotor/suspension assembly to its original orientation with respect to the substrate.

4. The gyroscope of claim 3 wherein the drive source further comprises a pair of linear actuators phase shifted to operate substantially 90 degrees apart in phase; a first drive linkage; and a second drive linkage, with each drive linkage coupled to one of the linear actuators on one end of the drive linkages, and coupled to each other at a second end of the drive linkages, the first drive linkage further being rotatably coupled to the rotor/suspension assembly to provide torque to the rotor/suspension assembly for rotation thereof.

5. The gyroscope of claim 4 wherein the rotor/suspension assembly further comprises:
   a.) a shaft fabricated upon and coupled to the substrate;
   b.) a rotatable anchor element suspended adjacent to the substrate by the shaft;
   c.) a suspension element attached to the anchor element by a first plurality of torsional flexures; and
   d.) a rotor wheel attached to the suspension element by a plurality of torsional flexures oriented sustantially orthogonally to the first plurality of torsional flexures.

6. The gyroscope of claim 5, wherein the anchor element further comprises a center pivot fabricated substantially in the center of the anchor element and rotationally coupled to the shaft, and a link pivot fabricated adjacent to the center pivot on the anchor element and rotationally coupled to the first drive linkage.

7. The gyroscope of claim 6 wherein the rotor/suspension assembly further comprises means for sensing and restoring orientation of the rotor wheel fabricated upon the substrate adjacent and in close proximity to a periphery of the rotor wheel, the means for sensing and restoring being in electronic communication with the electronic control means and adapted to obtain and communicate information about the rotor wheel's angular speed, acceleration and orientation displacement relative to the substrate, and by direction from the electronic control means, to selectively apply a preselected electrostatic force to the rotor/suspension assembly to restore the rotor/suspension assembly to its original orientation with respect to the substrate.

8. The gyroscope of claim 7 wherein the means for sensing and restoring orientation includes at least three sense and force elements spaced substantially equally apart and partially positioned over the rotor wheel to thereby form a gap between each sense and force element and the rotor wheel.

9. The gyroscope of claim 8 wherein each sense and force element comprises a pair of cantilevered beams, one beam being a sensing element and the other beam being a forcing element, each sensing element being adapted to obtain information relating to distance variations in the gap, and each forcing element being adapted to selectively apply an attractive but controlled force to the rotor wheel as required to return the rotor/suspension assembly to its original orientation with respect to the substrate.

10. A micromachined gyroscope comprising:
    a.) a rotatable rotor/suspension assembly formed upon a silicon substrate;
    b.) a microengine formed upon the silicon substrate in the microdomain adjacent to the rotor/suspension assembly, the microengine including a pair of actuators operating substantially 90 degrees apart in phase; a first drive linkage; and a second drive linkage, the first and second drive linkages being attached to each actuator at a first end of each linkage, and a second end of each drive linkage being connected together, with the first drive linkage further being rotatably coupled to the rotor/suspension assembly; and
    c.) means for electronic control in electrical communication with the microengine and the rotor/suspension assembly and operation and control thereof.

11. The gyroscope of claim 10 wherein the electronic control means is formed upon the silicon substrate in the microdomain adjacent to the rotor/suspension assembly and the microengine and is adapted to control the operation of the microengine, to measure the rotational speed of the rotor/suspension assembly, to determine a distance differential due to the angular rotation of the substrate, to determine the angular orientation of the rotor/suspension assembly with respect to the substrate and to selectively apply a preselected electrostatic force to the rotor/suspension assembly to restore the rotor/suspension assembly to its original orientation with respect to the substrate.

12. The gyroscope of claim 11 wherein the rotor/suspension assembly comprises a support shaft fabricated on the substrate, an anchor element suspended on the substrate by the shaft and having a substantially centered center pivot, a suspension element attached to and circumscribing the anchor element by a plurality of Z-axis flexures, and a rotor wheel attached to and circumscribing the suspension element by a plurality of X-axis flexures.

13. The gyroscope of claim 12 wherein the rotor/suspension assembly further comprises means for sensing and restoring orientation of the rotor wheel fabricated upon the substrate adjacent to and superposed with a periphery of the rotor wheel, the sensing and restoring orientation means being in electrical communication with the electronic control means and tailored to obtain and communicate information about the rotor wheel's angular speed, acceleration and orientation displacement relative to the substrate, and by direction from the electronic control means, to selectively apply a preselected electrostatic force to the rotor/ suspension assembly to restore the rotor/suspension assembly to its original orientation with respect to the substrate.

14. The gyroscope of claim 13 wherein the sensing and restoring orientation means includes at least three sense and force elements spaced substantially 120 degrees apart about the rotor wheel, with each sense and force element being fabricated spaced from the rotor wheel by a predetermined gap.

15. The gyroscope of claim 14 wherein each sense and force element comprises a pair of cantilevered beams, one beam being a sensing element and the other beam being a forcing element, with each sensing element being adapted to obtain information relating to distance variations in the gap, and with each forcing element being adapted to selectively apply an attractive but controlled force to the rotor wheel as required to return the rotor/suspension assembly to its original orientation with respect to the substrate.

16. A gyroscope fabricated, operated and controlled at sizes equal to or less than the millimeter domain, comprising a rotatable rotor/suspension assembly; an engine; and means for electronic control, all located upon a common substrate, the engine being mechanically coupled to the rotor/suspension assembly to provide a predetermined rotational torque to the rotor/suspension assembly, the engine and the rotor/suspension assembly further being in electronic communication with the electronic control means acting to control operation of the engine, to measure the rotational speed of the rotor/suspension assembly, to determine an angular orientation of the rotor/suspension assembly with respect to the substrate, and to control an electrostatic force applied to the rotor/suspension assembly to restore the rotor/suspension assembly to its original orientation with respect to the substrate.

17. The gyroscope of claim 16 wherein the engine further comprises a pair of actuators operating substantially 90 degrees apart in phase, a first drive linkage and a second drive linkage, the first and second drive linkages being attached to each actuator at a first end of the drive linkages, and the drive linkages being coupled together at a second end thereof, the first drive linkage being rotatably coupled to the rotor/suspension assembly.

18. The gyroscope of claim 17 wherein the rotor/suspension assembly further comprises a support shaft fabricated on the substrate; an anchor element suspended over the substrate by the shaft and having a substantially centered center pivot; a suspension element attached to and circumscribing the anchor element by a plurality of Z-axis flexures; and a rotor wheel attached to and circumscribing the suspension element by a plurality of X-axis flexures.

19. The gyroscope of claim 18 wherein the rotor/suspension assembly further comprises means for sensing and restoring orientation of the rotor wheel fabricated upon the substrate adjacent to and superposed with a periphery of the rotor wheel, the means for sensing and restoring being in electronic communication with the electronic control means and adapted to obtain and communicate information about the rotor wheel's angular speed, acceleration and orientation displacement relative to the substrate, and by direction from the electronic control means, to selectively apply a preselected electrostatic force to the rotor/suspension assembly to restore the rotor/suspension assembly to its original orientation with respect to the substrate.

* * * * *